US012781112B2

(12) United States Patent
Ogawa et al.

(10) Patent No.: US 12,781,112 B2
(45) Date of Patent: Nov. 3, 2026

(54) CURABLE COMPOSITION AND USE OF SAME

(71) Applicant: KANEKA CORPORATION, Osaka (JP)

(72) Inventors: Akira Ogawa, Hyogo (JP); Masaomi Sakabe, Hyogo (JP); Ayako Yano, Hyogo (JP)

(73) Assignee: KANEKA CORPORATION, Osaka (JP)

(*) Notice: Subject to any disclaimer, the term of this patent is extended or adjusted under 35 U.S.C. 154(b) by 253 days.

(21) Appl. No.: 18/839,990

(22) PCT Filed: Feb. 7, 2023

(86) PCT No.: PCT/JP2023/003898

§ 371 (c)(1),
(2) Date: Aug. 20, 2024

(87) PCT Pub. No.: WO2023/162664

PCT Pub. Date: Aug. 31, 2023

(65) Prior Publication Data

US 2026/0176511 A1 Jun. 25, 2026

(30) Foreign Application Priority Data

Feb. 22, 2022 (JP) ................................ 2022-026011

(51) Int. Cl.
*C09J 183/12* (2006.01)
*C09J 11/04* (2006.01)
*C09J 11/08* (2006.01)

(52) U.S. Cl.
CPC ............ *C09J 183/12* (2013.01); *C09J 11/04* (2013.01); *C09J 11/08* (2013.01)

(58) Field of Classification Search
None
See application file for complete search history.

(56) References Cited

U.S. PATENT DOCUMENTS

2003/0096904 A1 5/2003 Hakuta et al.
2006/0089430 A1* 4/2006 Kawakami ............. C08L 95/00 524/59
2006/0089432 A1 4/2006 Kawakami et al.
2006/0189736 A1* 8/2006 Mori ................. C08G 18/4837 524/404
2009/0264602 A1 10/2009 Mori et al.
2023/0076565 A1 3/2023 Smits et al.

FOREIGN PATENT DOCUMENTS

JP 2005-54174 A 3/2005
JP 2013-32675 A 2/2013
JP 2016-98302 A 5/2016
JP 2017-89258 A 5/2017
JP 2019-183090 A 10/2019
WO 2006046472 A1 5/2006
WO 2006046473 A1 5/2006
WO 2021206026 A1 10/2021

OTHER PUBLICATIONS

International Search Report issued in corresponding International Application No. PCT/JP2023/003898, dated Mar. 28, 2023 (4 pages).
Written Opinion issued in corresponding International Application No. PCT/JP2023/003898, dated Mar. 28, 2023 (7 pages).
Extended European Search Report issued in corresponding European Application No. 23759668.9, mailed Apr. 14, 2025 (6 pages).

* cited by examiner

*Primary Examiner* — Daniel J. Schleis

(74) *Attorney, Agent, or Firm* — Osha Bergman Watanabe & Burton LLP

(57) ABSTRACT

The object is to provide, without use of an epoxy resin, a curable composition which has good workability and which has excellent adhesiveness even after an alkaline treatment. The object is attained by providing a curable composition containing: (A) 100 parts by weight of an organic polymer having a hydrolyzable silyl group; (B) 3 parts by weight to 35 parts by weight of at least one type of process oil selected from the group consisting of paraffinic process oils, naphthenic process oils, and aromatic process oils; (C) 20 parts by weight to 200 parts by weight of silica sand; and (D) 2 parts by weight to 10 parts by weight of a silane compound having an epoxy group and/or a silane compound having an amino group.

7 Claims, No Drawings

CURABLE COMPOSITION AND USE OF SAME

TECHNICAL FIELD

The present invention relates to a curable composition, a cured product of the curable composition, an adhesive agent, and a laminated body.

BACKGROUND ART

Conventionally, a curable composition containing an organic polymer having a hydrolyzable silyl group is used for a tile adhesive agent and the like, and required to have alkali resistance. Previously, the alkali resistance has been imparted to the curable composition, by adding an epoxy resin to the curable composition.

For example, Patent Literature 1 discloses a two-liquid type curable resin composition which contains a specific amount of an epoxy resin as an A liquid and a specific amount of tertiary amine as a B liquid and in which a crosslinkable silicon group-containing organic polymer, a filler, a diluent, a silane coupling agent, and a catalyst are contained in one or both of the A liquid and the B liquid.

CITATION LIST

Patent Literature

[Patent Literature 1]
Japanese Patent Application Publication Tokukai No. 2019-183090

SUMMARY OF INVENTION

Technical Problem

However, the above-described technique has room for improvement in terms of an odor caused mainly by use of an amine-based curing agent for an epoxy resin. In a case where the curable resin composition is used for an adhesive agent and the like, the curable resin composition is required to also have workability.

Under the circumstances, the object of the present invention is to provide, without use of an epoxy resin, a curable composition which has good workability and which has excellent adhesiveness even after an alkaline treatment.

Solution to Problem

The inventors of the present invention conducted diligent studies in order to attain the above object, and consequently found, for the first time, that, in a case where a curable composition containing an organic polymer having a hydrolyzable silyl group contains respective specific amounts of a specific process oil, silica sand, and a specific silane compound, the curable composition has good workability and has excellent adhesiveness even after an alkaline treatment, while having a reduced odor.

Therefore, an aspect of the present invention is a curable composition (hereinafter referred to as "the present curable composition") containing: (A) 100 parts by weight of an organic polymer having a hydrolyzable silyl group; (B) 3 parts by weight to 35 parts by weight of at least one type of process oil selected from the group consisting of paraffinic process oils, naphthenic process oils, and aromatic process oils; (C) 20 parts by weight to 200 parts by weight of silica sand; (D) 2 parts by weight to 10 parts by weight of a silane compound having an epoxy group and/or a silane compound having an amino group.

Advantageous Effects of Invention

An aspect of the present invention makes it possible to provide, without use of an epoxy resin, a curable composition which has good workability and which has excellent adhesiveness even after an alkaline treatment.

DESCRIPTION OF EMBODIMENTS

The following description will discuss embodiments of the present invention in detail. Note that a numerical range expressed as "A to B" means "not less than A and not more than B", unless otherwise specified herein. All of the documents cited herein are incorporated herein by reference.

1. Outline of the Present Invention

Conventionally, a curable composition in which an organic polymer having a hydrolyzable silyl group is used (for example, an adhesive agent for an exterior tile) is made compliant with an alkali hot water resistance adhesiveness test by using an epoxy resin in combination. However, tertiary amine used as a curing agent of the epoxy resin, ketimine in the case of a one-liquid type curable composition, and the like have an amine odor. Therefore, the curable composition has a problem that the curable composition is limited in terms of places where the curable composition can be used and is difficult to use indoors.

Thus, the inventors of the present invention conducted diligent studies on a curable composition which contains an organic polymer having a hydrolyzable silyl group and in which an odor is reduced and alkali resistance is imparted without use of an epoxy resin, and consequently found, for the first time, that, by adding a specific process oil and a specific silane compound to the curable composition, the curable composition which has excellent adhesiveness even after an alkaline treatment is obtained. The inventors of the present invention also found, for the first time, that, by further adding silica sand to the curable composition, the workability of the curable composition is improved.

A technique of, without use of an epoxy resin, (i) ensuring good workability of a curable composition containing an organic polymer having a hydrolyzable silyl group and (ii) imparting alkali resistance to the curable composition, while solving a problem of an odor has not been known, and the present invention brings about an extremely advantageous effect. In particular, it should be surprising that adding a specific process oil enhances the adhesiveness after the alkaline treatment.

As described above, with a configuration of an aspect of the present invention, a curable composition which contains an organic polymer having a hydrolyzable silyl group and in which good workability is exhibited and alkali resistance is imparted while a problem of an odor is solved is obtained. Therefore, an aspect of the present invention is capable of contributing to attaining, for example, the sustainable development goals (SDGs) such as Goal 11 "Make cities inclusive, safe, resilient and sustainable".

Note that, in this specification, "having alkali resistance" is intended to mean having an adhesion strength of not less than 0.40 $N/mm^2$ and a cohesive failure rate of not less than 50%, when an alkali hot water immersion treatment is carried out by a method described in Examples. The following description will discuss a configuration of the present curable composition in detail.

2. Curable Composition

The present curable composition contains: (A) 100 parts by weight of an organic polymer having a hydrolyzable silyl group; (B) 3 parts by weight to 35 parts by weight of at least one type of process oil selected from the group consisting of paraffinic process oils, naphthenic process oils, and aromatic process oils; (C) 20 parts by weight to 200 parts by weight of silica sand; and (D) 2 parts by weight to 10 parts by weight of a silane compound having an epoxy group and/or a silane compound having an amino group.

Hereinafter, the “organic polymer having a hydrolyzable silyl group” may be referred to as “organic polymer having a hydrolyzable silyl group (A)” or “(A) component”. Similarly, the “paraffinic process oils, naphthenic process oils, and aromatic process oils” may be referred to as “paraffinic process oils, naphthenic process oils, and aromatic process oils (B)” or “(B) component”. The “silica sand” may be referred to as “silica sand (C)” or “(C) component”. The “silane compound having an epoxy group and/or a silane compound having an amino group” may be referred to as “silane compound having an epoxy group and/or a silane compound having an amino group (D)” or “(D) component”. A “hydrolyzable silyl group-containing polyoxyalkylene-based polymer (A1)” may be referred to as “(A1) component”. A “hydrolyzable silyl group-containing (meth)acrylic ester-based copolymer (A2)” may be referred to as “(A2) component”.

(2-1. Organic Polymer Having Hydrolyzable Silyl Group (A))

The present curable composition contains the organic polymer having a hydrolyzable silyl group (A). In an embodiment of the present invention, the organic polymer having a hydrolyzable silyl group (A) is preferably constituted by a hydrolyzable silyl group-containing polyoxyalkylene-based polymer (A1) (hereinafter may be referred to as “(A1) component”) and/or a hydrolyzable silyl group-containing (meth)acrylic ester-based copolymer (A2) (hereinafter may be referred to as “(A2) component”.

In this specification, a weight average molecular weight (Mw) and a number average molecular weight (Mn) are values measured by gel permeation chromatography (GPC) in terms of standard polystyrene.

The molecular weight of the (A) component can be expressed by a terminal group equivalent molecular weight. The terminal group equivalent molecular weight is found as follows. That is, a polymer precursor into which no hydrolyzable silyl group has been introduced is subjected to a titrimetric analysis based on the respective principles of (i) a hydroxy value measurement method defined in JIS K 1557 and (ii) an iodine value measurement method defined in JIS K 0070 so as to directly measure a terminal group concentration. Then, in consideration of a structure (branching degree determined in accordance with a polymerization initiator used) of the polymer, the terminal group equivalent molecular weight is found. The terminal group equivalent molecular weight of the polymer (A) can also be obtained as follows. That is, calibration curves of the number average molecular weight (Mn), obtained by general GPC measurement, and the terminal group equivalent molecular weight of the polymer precursor are created. Then, the number average molecular weight (Mn), obtained by GPC, of the hydrolyzable silyl group-containing polymer is converted into the terminal group equivalent molecular weight.

<Hydrolyzable Silyl Group-Containing Polyoxyalkylene-Based Polymer (A1)>

The hydrolyzable silyl group-containing polyoxyalkylene-based polymer (A1) is a compound in which a polymer part (also referred to as “main chain”) of a hydrolyzable silyl group-containing polymer is polyoxyalkylene. The hydrolyzable silyl group-containing polyoxyalkylene-based polymer (A1) forms a siloxane bond between molecules and forms a crosslinked product under a specific condition known to a person skilled in the art.

In an embodiment of the present invention, the lower limit of the number average molecular weight (Mn) of the (A1) component is preferably not less than 500, more preferably not less than 1,500, even more preferably not less than 5,000, and most preferably not less than 10,000. The upper limit of the number average molecular weight of the (A1) component is preferably not more than 100,000, more preferably not more than 50,000, and even more preferably not more than 40,000. It is preferable that the number average molecular weight fall within the above range, in terms of ease of handling, such as the workability, and the adhesiveness.

In an embodiment of the present invention, a ratio between the weight average molecular weight (Mw) of the (A1) component and the number average molecular weight (Mn) of the (A1) component (Mw/Mn; molecular weight distribution) is preferably not more than 1.6, more preferably not more than 1.5, even more preferably not more than 1.4, particularly preferably not more than 1.3, and peculiarly preferably not more than 1.2. It is preferable that the molecular weight distribution fall within the above range, in terms of ease of handling, such as the workability, and the adhesiveness.

[Hydrolyzable Silyl Group]

The structure of the hydrolyzable silyl group contained in the (A1) component is not limited in particular. A hydrolyzable silyl group generally used in the present technical field may be used.

In an embodiment, the hydrolyzable silyl group of the (A1) component is represented by a general formula (1) below. Two or more types of hydrolyzable silyl groups represented by the general formula (1) may be contained in one polymer molecule.

$$—Si(R^1)_{3-a}(X)_a \quad (1)$$

In the formula, $R^1$ represents a substituted or unsubstituted hydrocarbon group having 1 to 20 carbon atoms (in a case where the hydrocarbon group is substituted, the hydrocarbon group may be substituted with a hetero atom-containing group). In a case where two or more $R^1$ are present in one hydrolyzable silyl group, the two or more $R^1$ may be identical to or different from each other. Examples of $R^1$ include alkyl groups having 1 to 20 carbon atoms, aryl groups having 6 to 20 carbon atoms, and aralkyl groups having 7 to 20 carbon atoms.

X represents a hydroxy group or a hydrolyzable group. Examples of the hydrolyzable group include hydroxy groups, halogens, alkoxy groups, acyloxy groups, ketoxymate groups, amino groups, amide groups, acid amide groups, aminooxy groups, mercapto groups, and alkenyloxy groups. Among these groups, the alkoxy groups such as methoxy groups and ethoxy groups are more preferable, the methoxy groups and the ethoxy groups are even more preferable, and the methoxy groups are particularly preferable, because these groups have gentle hydrolyzability and are easy to handle.

"a" is 1, 2, or 3. "a" is preferably 2 or 3 that causes condensation by which a network structure is formed and a cured product is obtained.

In general, alkoxy groups having fewer carbon atoms are more reactive. That is, reactivity decreases in order of methoxy groups, ethoxy groups, and propoxy groups. This property can be used to determine, as appropriate, a specific structure of the hydrolyzable silyl group, depending on a method for producing the (A1) component and an application of the (A1) component.

Specific examples of the hydrolyzable silyl group include trimethoxysilyl groups, triethoxysilyl groups, triisopropoxysilyl groups, dimethoxymethylsilyl groups, diethoxymethylsilyl groups, diisopropoxymethylsilyl groups, (chloromethyl)dimethoxysilyl groups, and (methoxymethyl) dimethoxysilyl groups.

In consideration of the physical properties of the cured product to be obtained and availability and ease of handling of raw material compounds, the hydrolyzable silyl group is preferably a dialkoxysilyl group or a trialkoxysilyl group. In consideration of excellent shape maintaining properties of the curable composition and during curing of the curable composition, a dialkoxysilyl group is preferable. In consideration of a high crosslinking reaction speed, a trialkoxysilyl group is preferable.

The lower limit of the number of hydrolyzable silyl groups contained in one polymer molecule is preferably not less than 0.5, more preferably not less than 1.0, and even more preferably not less than 1.5. The upper limit of the number of hydrolyzable silyl groups contained in one polymer molecule is preferably not more than 5.0, and more preferably not more than 4.0. In a case where the number of hydrolyzable silyl groups falls within the above range, sufficient plasticity is imparted to the cured product to be obtained by a condensation reaction of the silyl group.

The hydrolyzable silyl group may be distributed randomly or in a block manner. The hydrolyzable silyl group may be distributed at any position in a polymer molecule. Preferably, such a distribution position of the hydrolyzable silyl group includes a terminal of the polymer molecule or a vicinity of the terminal of the polymer molecule. More preferably, the distribution position of the hydrolyzable silyl group is localized at the terminal of the polymer molecule or in the vicinity of the terminal of the polymer molecule. In an embodiment of the present invention, the "vicinity of the terminal of the polymer molecule" indicates a region from each terminal of the polymer molecule to a specific position in the polymer molecule. The weight of the region accounts for not more than 20% by weight, not more than 15% by weight, or not more than 10% by weight of the total weight of the polymer molecule. In an embodiment of the present invention, the phrase "localized at the terminal of the polymer molecule or in the vicinity of the terminal of the polymer molecule" indicates that the number of hydrolyzable silyl groups located at the terminal or the vicinity of the terminal accounts for not less than 70%, not less than 80%, or not less than 90% of the number of hydrolyzable silyl groups contained in the polymer molecule.

A method for introducing the hydrolyzable silyl group into a polyoxyalkylene-based polymer may be a known method.

[Polyoxyalkylene]

A polyoxyalkylene structure in the (A1) component may be linear or branched. Preferably, the polyoxyalkylene structure is a structure derived from polyoxypropylene diol or polyoxypropylene triol.

A polyoxyalkylene-based polymer molecule may be constituted by only one type of repeating unit or may contain two or more types of repeating units. One type of polyoxyalkylene-based polymer may be contained or two or more types of polyoxyalkylene-based polymers may be contained.

Examples of a main chain structure of the polyoxyalkylene-based polymer include a structure which has a repeating unit represented by the following general formula (2). In the formula, $R^2$ is a bivalent alkylene group.

$$—R^2—O— \quad (2)$$

The structure represented by the general formula (2) accounts for preferably not less than 50% by weight, more preferably not less than 70% by weight, and even more preferably not less than 90% by weight of the total weight of the polyoxyalkylene-based polymer in the (A1) component.

A specific structure of $R^2$ contained in the general formula (2) is not particularly limited. $R^2$ is preferably an alkylene group having 1 to 14 carbon atoms, and more preferably a linear or branched alkylene group having 2 to 4 carbon atoms.

Specific examples of the repeating unit represented by the general formula (2) include: $—CH_2O—$, $—CH_2CH_2O—$, $—CH_2CH(CH_3)O—$, $—CH_2CH(C_2H_5)O—$, $—CH_2C(CH_3)_2O—$, and $—CH_2CH_2CH_2CH_2O—$. Among these repeating units, $—CH_2CH(CH_3)O—$ is preferable. In a case where the polyoxyalkylene-based polymer includes $—CH_2CH(CH_3)O—$ in the repeating unit, the glass transition temperature (Tg) of the polyoxyalkylene-based polymer is easily adjusted to not higher than 0° C.

The polyoxyalkylene-based polymer may contain a urethane bond or a urea bond in the main chain structure.

As the polyoxyalkylene-based polymer, a commercially available product can also be used. Examples of the commercially available product include: Kaneka MS Polymer (registered trademark) S810, S257, S327, S203H, and S303H (each available from KANEKA CORPORATION); Silyl (registered trademark) SAX220, SAT350, SAT400, SAX510, SAX520, SAX580, SAX590, and SAX750 (each available from KANEKA CORPORATION); Excestar (registered trademark) ES-S2410, ES-S2420, and ES-S3630 (each available from AGC Inc.); and GENIOSIL (registered trademark) STP-E10, STP-E15, STP-E-30, and STP-E-35 (each available from Wacker).

(Method for Producing Polyoxyalkylene-Based Polymer)

As a method for producing the hydrolyzable silyl group-containing polyoxyalkylene-based polymer (A1), the following methods (I) to (III) can be used;

(I) a method in which (i) a hydroxy group-terminated polyoxyalkylene-based polymer is obtained by a method in which a double metal cyanide complex catalyst is used to polymerize an epoxy compound with a hydroxy group-containing initiator, (ii) thereafter a hydroxy group of the hydroxy group-terminated polyoxyalkylene-based polymer thus obtained is converted into a carbon-carbon unsaturated group, and then (iii) a silane compound is added to the obtained polymer by a hydrosilylation reaction;

(II) a method in which (i) a hydroxy group-terminated polyoxyalkylene-based polymer is obtained by a method in which a double metal cyanide complex catalyst is used to polymerize an epoxy compound with a hydroxy group-containing initiator, and then (ii) the hydroxy group-terminated polyoxyalkylene-based polymer thus obtained is reacted with a compound having both a hydrolyzable silyl group and a group that is reactive with a hydroxy group; and (III) a method in which (i) an isocyanate group-terminated polymer is obtained by reacting a hydroxy group-terminated polyoxyalkylene-based polymer and an excessive polyisocyanate compound, and then (ii) a compound having both a hydrolyzable silyl group and a group that is reactive with an isocyanate group is reacted with the isocyanate group-terminated polymer.

The hydroxy group-containing initiator used in each of the methods (I) and (II) includes initiators each having one or more hydroxy groups, such as ethylene glycol, propylene glycol, glycerin, pentaerythritol, polypropylene glycol having a low molecular weight, polyoxypropylene triol, allyl alcohol, methanol, ethanol, propanol, butanol, pentanol, hexanol, a polypropylene monoallyl ether, and a polypropylene monoalkyl ether.

The epoxy compound used in each of the methods (I) and (II) includes: alkylene oxides such as ethylene oxide and propylene oxide; and glycidyl ethers such as methyl glycidyl ether and allyl glycidyl ether. Among these compounds, the propylene oxide is preferable.

The carbon-carbon unsaturated group used in the method (I) include vinyl groups, allyl groups, methallyl groups, and propargyl groups. Among these groups, the allyl groups are preferable.

A method for converting the hydroxy group into the carbon-carbon unsaturated group in (I) is preferably a method in which (i) an alkali metal salt is caused to act on the hydroxy group-terminated polymer, and then (ii) the polymer is reacted with a halogenated hydrocarbon compound having a carbon-carbon unsaturated bond.

The halogenated hydrocarbon compound used in the method (I) include vinyl chlorides, allyl chlorides, methallyl chlorides, propargyl chlorides, vinyl bromides, allyl bromides, methallyl bromides, propargyl bromides, vinyl iodides, allyl iodides, methallyl iodides, and propargyl iodides.

The hydrosilane compound used in the method (I) can be trimethoxysilane, triethoxysilane, tris(2-propenyloxy)silane, triacetoxysilane, dimethoxymethylsilane, (chloromethyl)dimethoxysilane, (methoxymethyl)dimethoxysilane, (N,N-diethylaminomethyl)dimethoxysilane, or the like.

The hydrosilylation reaction used in the method (I) is accelerated by various catalysts. A hydrosilylation catalyst may be a known catalyst. For example, the hydrosilylation catalyst can be any of the following: a catalyst obtained by causing platinum to be supported on a carrier such as alumina, silica, carbon black, or the like; chloroplatinic acid; a chloroplatinic acid complex composed of a chloroplatinic acid and alcohol, aldehyde, ketone, or the like; a platinum-olefin complex [for example, $Pt(CH_2{=}CH_2)_2$ $(PPh_3)$, $Pt(CH_2{=}CH_2)_2Cl_2$]; a platinum-vinylsiloxane complex [$Pt\{(vinyl)Me_2SiOSiMe_2(vinyl)\}$, $Pt\{Me(vinyl)SiO\}_4$]; a platinum-phosphine complex [$Ph(PPh_3)_4$, $Pt(PBU_3)_4$]; a platinum-phosphite complex [$Pt\{P(OPh)_3\}_4$]; and the like.

The compound which has both a hydrolyzable silyl group and a group that is reactive with a hydroxy group and which can be used in the method (II) can be, for example, any of the following: isocyanate silanes such as 3-isocyanate propyltrimethoxysilane, 3-isocyanate propyldimethoxymethylsilane, 3-isocyanate propyltriethoxysilane, isocyanate methyltrimethoxysilane, isocyanate methyltriethoxysilane, and isocyanate methyldimethoxymethylsilane; mercaptosilanes such as 3-mercaptopropyltrimethoxysilane, 3-mercaptopropyldimethoxymethylsilane, and 3-mercaptopropyltriethoxysilane; and epoxysilanes such as 3-glycidoxypropyltrimethoxysilane, 3-glycidoxypropyldimethoxymethylsilane, and 3-glycidoxypropyltriethoxysilane.

The polyisocyanate compound which can be used in the method (III) include: aromatic polyisocyanates such as toluene (tolylene) diisocyanate, diphenylmethane diisocyanate, and xylylene diisocyanate; and aliphatic polyisocyanates such as isophorone diisocyanate and hexamethylene diisocyanate.

The compound which has both a hydrolyzable silyl group and a group that is reactive with an isocyanate group and which can be used in the method (III) include: amino group-containing silanes such as γ-aminopropyltrimethoxysilane, γ-aminopropyldimethoxymethylsilane, γ-aminopropyltriethoxysilane, N-(β-aminoethyl)-γ-aminopropyltrimethoxysilane, N-(β-aminoethyl)-γ-aminopropyldimethoxymethylsilane, N-(β-aminoethyl)-γ-aminopropyltriethoxysilane, γ-(N-phenyl) aminopropyltrimethoxysilane, γ-(N-phenyl) aminopropyldimethoxymethylsilane, N-ethylaminoisobutyltrimethoxysilane, N-ethylaminoisobutyldimethoxymethylsilane, N-cyclohexylaminomethyltrimethoxysilane, and N-cyclohexylaminomethyldimethoxymethylsilane; hydroxy group-containing silanes such as γ-hydroxypropyltrimethoxysilane and γ-hydroxypropyldimethoxymethylsilane; and mercapto group-containing silanes such as γ-mercaptopropyltrimethoxysilane and γ-mercaptopropyldimethoxymethylsilane.

As the hydrolyzable silyl group-containing polyoxyalkylene-based polymer (A1), a polyoxyalkylene-based polymer having a plurality of hydrolyzable silyl groups at one terminal can also be used. The polyoxyalkylene-based polymer having a plurality of hydrolyzable silyl groups at one terminal is synthesized, for example, as follows: (i) a hydroxy group-terminated polyoxyalkylene-based polymer is obtained by a method in which a double metal cyanide complex catalyst is used to polymerize an epoxy compound with a hydroxy group-containing initiator; (ii) a polyoxyalkylene-based polymer having a plurality of carbon-carbon unsaturated groups at one terminal is obtained by causing an alkali metal salt to act on a hydroxy group of the obtained hydroxy group-terminated polyoxyalkylene-based polymer, subsequently reacting the polymer with allyl glycidyl ether, further causing an alkali metal salt to act on a hydroxy group terminal thus produced, and then reacting the polymer with a halogenated hydrocarbon compound having a carbon-carbon unsaturated bond; and (iii) a silane compound is added, by a hydrosilylation reaction, to the obtained polyoxyalkylene-based polymer having a plurality of carbon-carbon unsaturated groups at one terminal or (iv) an epoxy compound having a hydrolyzable silyl group is reacted with the hydroxy group-containing initiator in the middle of or after the step (i).

<Hydrolyzable Silyl Group-Containing (Meth)Acrylic Ester-Based Copolymer (A2)>

The hydrolyzable silyl group-containing (meth)acrylic ester-based copolymer (A2) is a compound in which a polymer part of a hydrolyzable silyl group-containing polymer is a (meth)acrylic ester-based copolymer. The hydrolyzable silyl group-containing (meth)acrylic ester-based copolymer (A2) forms a siloxane bond between molecules and forms a crosslinked product under a specific condition known to a person skilled in the art.

In an embodiment of the present invention, the lower limit of the number average molecular weight (Mn) of the (A2)

component is preferably not less than 500, more preferably not less than 1,500, even more preferably not less than 5,000, and most preferably not less than 10,000. The upper limit of the number average molecular weight of the (A2) component is preferably not more than 100,000, more preferably not more than 50,000, and even more preferably not more than 45,000. It is preferable that the number average molecular weight fall within the above range, in terms of ease of handling, such as the workability, and the adhesiveness.

In an embodiment of the present invention, a ratio between the weight average molecular weight (Mw) of the (A2) component and the number average molecular weight (Mn) of the (A2) component (Mw/Mn; molecular weight distribution) is preferably not more than 1.6, more preferably not more than 1.5, even more preferably not more than 1.4, particularly preferably not more than 1.3, and peculiarly preferably not more than 1.2. It is preferable that the molecular weight distribution fall within the above range, in terms of ease of handling, such as the workability, and the adhesiveness.

[Hydrolyzable Silyl Group]

To a hydrolyzable silyl group in the hydrolyzable silyl group-containing (meth)acrylic ester-based copolymer (A2), the description in the section [Hydrolyzable silyl group] of the above <Hydrolyzable silyl group-containing polyoxyalkylene-based polymer (A1)> is applied.

[(Meth)acrylic Ester]

A (meth)acrylic ester contains a structural unit derived from a (meth)acrylic monomer. In this specification, the "(meth)acrylic" refers to acrylic and/or methacrylic.

A (meth)acrylic ester structure in the (A2) component may be linear or branched.

A (meth)acrylic ester molecule may be constituted by only one type of repeating unit or may contain two or more types of repeating units. One type of (meth)acrylic ester may be contained or two or more types of (meth)acrylic esters may be contained.

Examples of the (meth)acrylic ester structure include a structure represented by the following general formula (3). In the formula, $R^3$ is a hydrogen atom or a methyl group, and $R^4$ is a group having one or more carbon atoms. The number of the carbon atoms in $R^4$ can be, for example, 1 to 22. $R^4$ can be an alkyl group, a cycloalkyl group, or an aryl group. $R^4$ may be substituted with a halogen, a hydroxy group, an alkoxy group, an amino group, or the like.

$$—CH(R^3)—CH(COOR^4)— \quad (3)$$

The structure represented by the general formula (3) is obtained by polymerization of a (meth)acrylic monomer.

Specific examples of the (meth)acrylic monomer include methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, octyl (meth)acrylate, 2-methoxyethyl (meth)acrylate, 3-methoxybutyl (meth) acrylate, 2-ethoxyethyl (meth)acrylate, 2-butoxyethyl (meth)acrylate, isopropoxyethyl (meth)acrylate, phenyl (meth)acrylate, tolyl (meth)acrylate, benzyl (meth)acrylate, 2-hydroxyethyl (meth)acrylate, 2-hydroxypropyl (meth) acrylate, 2,2,2-trifluoroethyl (meth)acrylate, glycidyl (meth) acrylate, 1-ethylcyclopentylether (meth)acrylate, dimethylaminoethyl (meth)acrylate, nonyl (meth)acrylate, decyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, icosyl (meth) acrylate, docosyl (meth)acrylate, lauryl (meth)acrylate, stearyl (meth)acrylate, oleyl (meth)acrylate, linoleyl (meth) acrylate, isobornyl (meth)acrylate, 2-aminoethyl (meth) acrylate, γ-(methacryloyloxypropyl) trimethoxysilane, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutyl ethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate.

Among the above-listed (meth)acrylic monomers, one or more selected from ethyl acrylate, n-propyl acrylate, n-butyl acrylate, 2-ethylhexyl acrylate, 2-ethylhexyl methacrylate, and stearyl acrylate are preferable. A main chain structure constituted by any of these monomers allows a glass transition temperature (Tg) to be easily adjusted to not higher than 0° C.

As the (meth)acrylic ester, a commercially available product can also be used. Examples of the commercially available product include: XMAP (registered trademark) SA100S, SA110S, SA120S, SA310S, and SA410S (each available from KANEKA CORPORATION); ARUFON (registered trademark) US-6100, US-6110, US-6120, US-6130, US-6140, US-6150, US-6170, US-6180, and US-6190 (each available from TOAGOSEI CO., LTD.); ACTFLOW NE-1000 (registered trademark) (available from SOKEN CHEMICAL & ENGINEERING CO., LTD.); and Joncryl (registered trademark) (available from BASF).

In an embodiment of the present invention, the (meth) acrylic ester preferably contains an XY diblock structure or an XYX triblock structure in the molecule. Note, here, that an X block is a block in which the hydrolyzable silyl group is contained in a relatively large amount. Note also that a Y block is a block in which the hydrolyzable silyl group is contained in a relatively small amount. Note that the entire molecular structure of the (meth)acrylic ester is not particularly limited, provided that the (meth)acrylic ester contains the XY diblock structure or the XYX triblock structure. For example, an XYXY tetrablock structure may be employed. Note, here, that the "XYX triblock structure" means a structure called "ABA triblock structure" among persons skilled in the art.

The number of repeating units which are derived from a hydrolyzable silyl group-containing monomer and which are contained in the X block is, on average, more than 1.0, preferably 1.5 or more, and more preferably 1.7 or more. Furthermore, the amount of the repeating units which are derived from a hydrolyzable silyl group-containing monomer and which are contained in the X block is preferably more than 3% by weight, more preferably not less than 4.5% by weight, and even more preferably not less than 5% by weight, with respect to the weight of all repeating units contained in the X block.

In an embodiment of the present invention, the (meth) acrylic ester is an XYX triblock polymer, and blocks (X blocks) constituting terminal parts of the (meth)acrylic ester each preferably have more than one hydrolyzable silyl group.

The amount of repeating units which are derived from a hydrolyzable silyl group-containing monomer and which are contained in the Y block is 0% by weight to 3% by weight, preferably 0% by weight to 2% by weight, and more preferably 0% by weight to 1% by weight, with respect to the weight of all repeating units contained in the Y block.

In the (meth)acrylic ester containing the XY diblock structure or the XYX triblock structure in the molecule, the repeating units derived from a hydrolyzable silyl group-containing monomer are localized in a region(s) at a terminal(s) or in a vicinity/vicinities of the terminal(s) (one terminal or both terminals).

(Method for Producing (Meth)Acrylic Ester)

The (meth)acrylic ester can be produced by a known polymerization method (such as a radical polymerization method, a cation polymerization method, or an anion polymerization method).

A preferable method for producing the hydrolyzable silyl group-containing (meth)acrylic ester-based copolymer (A2) can be any of the following methods (IV) to (VI).

(IV) A method in which a compound having a polymerizable unsaturated group and a hydrolyzable silyl group is copolymerized with a monomer a having (meth) acrylic structure.

(V) A method in which, in the presence of a compound which has a hydrolyzable silyl group and a mercapto group and which is a chain transfer agent, a monomer having a (meth)acrylic structure is copolymerized.

As a combination of (IV) and (V), a method can also be employed in which, in the presence of mercaptan which has a hydrolyzable silyl group and which is a chain transfer agent, a compound having a polymerizable unsaturated group and a hydrolyzable silyl group is copolymerized with a monomer.

(VI) A method in which, after a monomer having a (meth)acrylic structure is polymerized by a living radical polymerization method, a hydrolyzable silyl group is introduced into a molecular chain terminal.

The living polymerization method in (VI) is preferable, because it is possible to introduce a functional group into a terminal of a polymer molecule, and possible to synthesize a (meth)acrylic ester having a small molecular weight distribution.

The compound which has a polymerizable unsaturated group and a hydrolyzable silyl group and which is used in (IV) include 3-(dimethoxymethylsilyl)propyl (meth)acrylate, (dimethoxymethylsilyl)methyl (meth)acrylate, (diethoxymethylsilyl)methyl (meth)acrylate, and ((methoxymethyl)dimethoxysilyl)propyl (meth)acrylate.

The compound which has a hydrolyzable silyl group and a mercapto group and which is used in (V) include 3-mercaptopropyldimethoxymethylsilane and (mercaptomethyl) dimethoxymethylsilane.

Examples of the living polymerization method in (VI) include a living radical polymerization method, a living cationic polymerization method, and a living anionic polymerization method. Among these polymerization methods, the living radical polymerization method is suitable for production of the (meth)acrylic ester. Examples of the living radical polymerization method include the following methods.

Atom transfer radical polymerization (ATRP) (see J. Am. Chem. Soc. 1995, 117, 5614; Macromolecules. 1995, 28, 1721)

Single electron transfer polymerization (SET-LRP) (see J. Am. Chem. Soc. 2006, 128, 14156; JPSChem 2007, 45, 1607)

Reversible chain transfer catalyzed polymerization (RTCP) (see "Living Radical Polymerizations with Organic Catalysts", "KOBUNSHI RONBUNSHU (Japanese Journal of Polymer Science and Technology)" 68, 223-231 (2011); Japanese Patent Application Publication, Tokukai, No. 2014-111798))

Reversible addition/fragmentation chain transfer polymerization method (RAFT polymerization)

Nitroxy radical method (NMP method)

Polymerization method using an organotellurium compound (TERP method)

Polymerization method using an organoantimony compound (SBRP method)

Polymerization method using an organobismuth compound (BIRP)

Iodine transfer polymerization method

Examples of a method for introducing the hydrolyzable silyl group into the (meth)acrylic ester include a method disclosed in Japanese Patent Application Publication Tokukai No. 2007-302749 and a method disclosed in Japanese Patent Application Publication Tokukai No. 2018-162394. In the method disclosed in Japanese Patent Application Publication Tokukai No. 2007-302749, the hydrolyzable silyl group is introduced by converting a functional group at the terminal of the (meth)acrylic ester. Specifically, the hydrolyzable silyl group is introduced by converting a molecule terminal of the (meth)acrylic ester into a hydroxy group, into an alkenyl group, and then into the hydrolyzable silyl group in this order. In the method disclosed in Japanese Patent Application Publication Tokukai No. 2018-162394, the hydrolyzable silyl group is introduced by copolymerization with a hydrolyzable silyl group-containing (meth) acrylic ester monomer. Specifically, the hydrolyzable silyl group is introduced into the terminal of the (meth)acrylic ester molecule or the vicinity of the terminal of the (meth) acrylic ester molecule by controlling, in accordance with a progress stage of living polymerization, the amount of the hydrolyzable silyl group-containing (meth)acrylic ester monomer to be introduced. A hydrolyzable silyl group-containing (meth)acrylic ester obtained by any of these methods has the hydrolyzable silyl group locally at a terminal of a molecule or in the vicinity of the terminal.

The upper limit of the glass transition temperature (Tg) of the (meth)acrylic ester in the (A2) component is preferably not higher than 100° C., more preferably not higher than 50° C., even more preferably not higher than 0° C., and most preferably not higher than −10° C. The lower limit of the glass transition temperature (Tg) of the (meth)acrylic ester is not limited in particular, but is preferably not lower than −80° C. and more preferably not lower than −70° C. The glass transition temperature of the (meth)acrylic ester is substantially regarded as the glass transition temperature of the (A2) component itself.

In an embodiment of the present invention, the (A1) component having a low viscosity and the (A2) component having a high viscosity can also be mixed and used as the (A) component. In a case where the (A1) component and the (A2) component are used in combination, there is an advantage that, as compared with a case where each component is used alone, the adhesiveness is further improved and also the workability is enhanced.

The viscosity of the (A1) component at 23° C. is not particularly limited, but is preferably 1 Pa·s to 100 Pa·s, more preferably 5 Pa's to 80 Pa·s, and even more preferably 10 Pa·s to 70 Pa·s. This configuration has an advantage that the curable composition to be obtained has a low viscosity.

The viscosity of the (A2) component at 23° C. is not particularly limited, but is preferably 6.0 Pa·s to 1,000 Pa·s, more preferably 50 Pa·s to 750 Pa·s, and even more preferably 100 Pa·s to 500 Pa·s. This configuration has an advantage that the adhesiveness of the curable composition to be obtained and the tensile elongation of the cured product to be obtained are enhanced.

The weight ratio (A1): (A2) of the (A1) component and the (A2) component is preferably 5:95 to 50:50. In a case where the weight ratio (A1): (A2) falls within this range, the cured product which exhibits plasticity and high shear adhesion strength can be obtained. Furthermore, in terms of achieving both high rigidity and plasticity, the weight ratio (A1): (A2) is preferably 100:0 to 50:50, and more preferably 100:0 to 70:30.

(2-2. (B) Component)

The present curable composition contains at least one type of process oil selected from the group consisting of paraffinic process oils, naphthenic process oils, and aromatic process oils (B). It is possible to impart alkali resistance by adding the (B) component to the present curable composition.

Examples of the paraffinic process oils include: Diana Process Oil PW-32, PW-90, PW-380, PS-32, PS-90, PS-430, PA-32, and PA-90 (available from Idemitsu Kosan Co., Ltd.); VC-clean AN100, AN110, AN200, AN220, AN230, AN240, AN1013, AN1416, A140, AI50, AI60, A170, AI80, and A195 and ISOPAR E, ISOPAR G, ISOPAR HBHT, ISOPAR L, and ISOPAR M (available from Andoh Parachemie Co., Ltd.); and SUNPAR 107, 110, 115, 150, 2100, and 2280 (available from JAPAN SUN OIL COMPANY, LTD.) Liquid paraffin (FUJIFILM Wako Pure Chemical Corporation) can also be used.

Examples of the naphthenic process oils include: Diana Process Oil NP-24, NR-68, NS-90S, NS-100, and NM-280 (available from Idemitsu Kosan Co., Ltd.); EXXSOL D40, EXXSOL D80, EXXSOL D110, EXXSOL D130, EXXSOL DSP80/100, EXXSOL DSP100/140, and EXXSOL D145/160 (available from Andoh Parachemie Co., Ltd.); and SUNTHENE 410, 415, 450, 4130, 4240, and 250J (available from JAPAN SUN OIL COMPANY, LTD.).

Examples of the aromatic process oils include: Diana Process Oil AC-12, AC-460, and AH-16 (available from Idemitsu Kosan Co., Ltd.); and JSO AROMA 790 (available from JAPAN SUN OIL COMPANY, LTD.)

In an embodiment of the present invention, the (B) component is preferably a naphthenic process oil and an aromatic process oil, from the viewpoint of adhesion strength after the alkaline treatment. In particular, the (B) component is preferably a naphthenic process oil, from the viewpoint of heat resistance.

The amount of the (B) component contained in the present curable composition is 3 parts by weight to 35 parts by weight, preferably 3.5 parts by weight to 33 parts by weight, and more preferably 4 parts by weight to 30 parts by weight, with respect to 100 parts by weight of the (A) component. In a case where the amount of the (B) component is 3 parts by weight to 35 parts by weight, excellent adhesiveness is exhibited even after the alkaline treatment.

(2-3. (C) component)

The present curable composition contains the silica sand (C). By adding the (C) component to the present curable composition, the workability, such as ease of application, is enhanced.

The average particle diameter of the (C) component is, for example, 10 μm to 800 μm, preferably 20 μm to 600 μm, more preferably 30 μm to 500 μm, and even more preferably 40 μm to 400 μm. In a case where the average particle diameter of the (C) component is 10 μm to 800 μm, more excellent workability is exhibited.

The amount of the (C) component contained in the present curable composition is 20 parts by weight to 200 parts by weight, preferably 30 parts by weight to 180 parts by weight, and more preferably 40 parts by weight to 160 parts by weight, with respect to 100 parts by weight of the (A) component. In a case where the amount of the (C) component is 20 parts by weight to 200 parts by weight, the workability is enhanced.

(2-4. (D) Component)

The present curable composition contains the silane compound having an epoxy group and/or the silane compound having an amino group (D). By adding the (D) component to the present curable composition, the adhesiveness is enhanced.

The silane compound having an epoxy group (also referred to as "epoxysilane") is not particularly limited, and examples thereof include γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane. In particular, γ-glycidoxypropyltrimethoxysilane is preferable from the viewpoint of the adhesiveness.

The silane compound having an amino group (hereinafter also referred to as "aminosilane") is not particularly limited, and examples thereof include γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane. In particular, γ-aminopropyltrimethoxysilane and γ-(2-aminoethyl)aminopropyltrimethoxysilane are preferable, and γ-(2-aminoethyl)aminopropyltrimethoxysilane is particularly preferable, from the viewpoint of the adhesiveness.

In an embodiment of the present invention, the (D) component is preferably the silane compound having an epoxy group, from the viewpoint of water resistance.

The amount of the (D) component contained in the present curable composition is 2 parts by weight to 10 parts by weight, preferably 2.2 parts by weight to 9 parts by weight, and more preferably 2.4 parts by weight to 8 parts by weight, with respect to 100 parts by weight of the (A) component. In a case where the amount of the (D) component is 2 parts by weight to 10 parts by weight, the workability is enhanced.

(2-5. Other Additives)

Any other additive(s) than the above components may be added to the present curable composition. Examples of the additive(s) include a silanol condensation catalyst, an adhesiveness imparting agent, a plasticizer, a solvent, a diluent, a filler, an anti-sagging agent, an antioxidant, a photo stabilizer, an ultraviolet absorbent, a physical property adjusting agent, a tackifier resin, a compound containing an epoxy group, a photocurable substance, and an oxygen curable substance.

<Silanol Condensation Catalyst>

For the present curable composition, a silanol condensation catalyst may be used for the purpose of (i) promoting a reaction in which the hydrolyzable silyl group of the organic polymer having a hydrolyzable silyl group (A) is hydrolyzed and condensed and (ii) extending the chain of the polymer or crosslinking the polymer.

Examples of the silanol condensation catalyst include organotin compounds, metal salts of carboxylic acids, amine compounds, carboxylic acids, and alkoxy metals.

Specific examples of the organotin compounds include dibutyltin dilaurate, dibutyltin dioctanoate, dibutyltin bis (butyl maleate), dibutyltin diacetate, dibutyltin oxide, dibutyltin bis(acetylacetonate), dioctyltin bis(acetylacetonate), dioctyltin dilaurate, dioctyltin distearate, dioctyltin diacetate, dioctyltin oxide, a reaction product of dibutyltin oxide and a silicate compound, a reaction product of dioctyltin oxide and a silicate compound, and a reaction product of dibutyltin oxide and phthalate ester.

Specific examples of the metal salts of carboxylic acids include tin carboxylate, bismuth carboxylate, titanium carboxylate, zirconium carboxylate, iron carboxylate, potassium carboxylate, and calcium carboxylate. As a carboxylic acid group, any of combinations of the carboxylic acids below and various metals can be employed.

Specific examples of the amine compounds include: amines such as octylamine, 2-ethylhexylamine, laurylamine, and stearylamine; nitrogen-containing heterocyclic compounds such as pyridine, 1,8-diazabicyclo[5,4,0]undecene-7 (DBU), and 1,5-diazabicyclo[4,3,0]nonene-5 (DBN); guanidines such as guanidine, phenylguanidine, and diphenylguanidine; biguanides such as butylbiguanide, 1-o-tolylbiguanide, and 1-phenylbiguanide; amino group-containing silane coupling agents; and ketimine compounds.

Specific examples of the carboxylic acids include acetic acid, propionic acid, butyric acid, 2-ethyl hexanoic acid, lauric acid, stearic acid, oleic acid, linoleic acid, neodecanoic acid, and versatic acid.

Specific examples of the alkoxy metals include: titanium compounds such as tetrabutyltitanate, titanium tetrakis (acetylacetonate), and diisopropoxytitanium bis(ethylacetocetate); aluminium compounds such as aluminum tris(acetylacetonate) and diisopropoxyaluminum ethyl acetoacetate; and zirconium compounds such as zirconium tetrakis (acetylacetonate).

As the other silanol condensation catalysts, a fluorine anion-containing compound, a photo acid generating agent, or a photo base generating agent can also be used.

Two or more different types of catalysts may be used in combination as the silanol condensation catalyst.

The amount of the silanol condensation catalyst used is preferably 0.001 parts by weight to 20 parts by weight, more preferably 0.01 parts by weight to 15 parts by weight, and particularly preferably 0.01 parts by weight to 10 parts by weight, with respect to 100 parts by weight of the organic polymer having a hydrolyzable silyl group (A).

<Adhesiveness Imparting Agent>

To the present curable composition, an adhesiveness imparting agent can be add.

As the adhesiveness imparting agent, a silane coupling agent or a reaction product of the silane coupling agent can be added.

Specific examples of the silane coupling agent include: amino group-containing silanes such as γ-aminopropyltrimethoxysilane, γ-aminopropylmethyldimethoxysilane, N-β-aminoethyl-γ-aminopropyltrimethoxysilane, N-β-aminoethyl-γ-aminopropylmethyldimethoxysilane, N-phenyl-γ-aminopropyltrimethoxysilane, and (2-aminoethyl)aminomethyltrimethoxysilane; isocyanate group-containing silanes such as γ-isocyanatepropyltrimethoxysilane, γ-isocyanatepropyltriethoxysilane, γ-isocyanatepropylmethyldimethoxysilane, α-isocyanatemethyltrimethoxysilane, and α-isocyanatemethyldimethoxymethylsilane; mercapto group-containing silanes such as γ-mercaptopropyltrimethoxysilane, γ-mercaptopropyltriethoxysilane, and γ-mercaptopropylmethyldimethoxysilane; and epoxy group-containing silanes such as γ-glycidoxypropyltrimethoxysilane and β-(3,4-epoxycyclohexyl)ethyltrimethoxysilane.

Condensates of various silane coupling agents, such as a condensate of aminosilane and a condensate of aminosilane and the other alkoxysilane, and reaction products of various silane coupling agents, such as a reaction product of aminosilane and epoxysilane and a reaction product of aminosilane and (meth)acrylic group-containing silane, can also be used.

One type of these adhesiveness imparting agents may be used alone, or two or more types thereof may be used in combination.

The amount of the silane coupling agent used is preferably 0.1 parts by weight to 20 parts by weight, and particularly preferably 0.5 parts by weight to 10 parts by weight, with respect to 100 parts by weight of the organic polymer having a hydrolyzable silyl group (A).

<Plasticizer>

To the present curable composition, a plasticizer can be add. Specific examples of the plasticizer include phthalate ester compounds such as dibutyl phthalate, diisononyl phthalate (DINP), diheptyl phthalate, di(2-ethylhexyl) phthalate, diisodecyl phthalate (DIDP), and butylbenzyl phthalate; terephthalic ester compounds such as bis(2-ethylhexyl)-1,4-benzenedicarboxylate; non-phthalic ester compounds such as 1,2-cyclohexanedicarboxylic acid diisononyl ester; aliphatic polyvalent carboxylic ester compounds such as dioctyl adipate, dioctyl sebacate, dibutyl sebacate, diisodecyl succinate, and tributyl acetylcitrate; unsaturated fatty acid ester compounds such as butyl oleate and methyl acetylricinoleate; phenyl alkylsulfonate esters; phosphoric ester compounds; trimellitic acid ester compounds; chlorinated paraffins; hydrocarbon-based oils such as alkyldiphenyl and partially hydrogenated terphenyl; process oils; and epoxy plasticizers such as epoxidized soybean oil and benzyl epoxy stearate.

A polymeric plasticizer can also be used. Specific examples of the polymeric plasticizer include vinyl-based polymers; polyester-based plasticizers; polyethers including (i) polyether polyols each having a number average molecular weight of not less than 500, such as polyethylene glycol and polypropylene glycol, and (ii) derivatives obtained by converting hydroxy groups of these polyether polyols into ester groups, ether groups, or the like; polystyrenes; polybutadiene, polybutene, polyisobutylene, butadiene-acrylonitrile, and polychloroprene.

The amount of the plasticizer used is preferably 5 parts by weight to 150 parts by weight, more preferably 10 parts by weight to 120 parts by weight, and particularly preferably 20 parts by weight to 100 parts by weight, with respect to 100 parts by weight of the organic polymer having a hydrolyzable silyl group (A). In a case where the amount of the plasticizer used is less than 5 parts by weight, an effect of the plasticizer is not exhibited. In a case where the amount of the plasticizer used is more than 150 parts by weight, the cured product has insufficient mechanical strength. One of these plasticizers may be used alone or two or more types thereof may be used in combination.

<Solvent, Diluent>

To the present curable composition, a solvent or a diluent can be added. The solvent and the diluent are not particularly limited, and aliphatic hydrocarbon, aromatic hydrocarbon, alicyclic hydrocarbon, halogenated hydrocarbon, alcohol, ester, ketone, ether, or the like can be used. In a case where the solvent or the diluent is used, the boiling point of the solvent is preferably not lower than 150° C., more preferably not lower than 200° C., and particularly preferably not lower than 250° C., due to a problem of contamination of the air when the composition is used indoors. One of the above solvents and diluents may be used alone, or two or more types thereof may be used in combination.

<Filler>

To the present curable composition, various fillers can be added. Examples of the fillers include heavy calcium carbonate, colloidal calcium carbonate, magnesium carbonate, silious earth, clay, calcined clay, talc, titanium oxide, fumed silica, precipitable silica, crystalline silica, fused silica, silicic anhydride, hydrous silicic acid, carbon black, ferric oxide, an aluminum fine powder, zinc oxide, active zinc oxide, a PVC powder, a PMMA powder, glass fibers, and a filament. One type of the above fillers may be used alone, or two or more types thereof may be used in combination.

The amount of the filler used is preferably 1 part by weight to 300 parts by weight, and particularly preferably 10 parts by weight to 250 parts by weight, with respect to 100 parts by weight of the organic polymer having a hydrolyzable silyl group (A).

For the purpose of reducing the weight (lowering the specific gravity) of the composition, organic balloons or inorganic balloons may be added. The balloons are spherical fillers which are hollow inside. Examples of a material of the balloons include inorganic materials, such as glass, shirasu, and silica, and organic materials, such as phenol resin, urea resin, polystyrene, and saran.

The amount of the balloons used is preferably 0.1 parts by weight to 100 parts by weight, and particularly preferably 1 part by weight to 20 parts by weight, with respect to 100 parts by weight of the organic polymer having a hydrolyzable silyl group (A).

<Anti-Sagging Agent>

To the present curable composition, an anti-sagging agent may be added, as necessary, in order to prevent sagging and improve the workability. The anti-sagging agent is not particularly limited, and examples thereof include: polyamide waxes; hydrogenated castor oil derivatives; metal soaps such as calcium stearate, aluminum stearate, and barium stearate; and silica. One of these anti-sagging agents may be used alone, or two or more types thereof may be used in combination.

The amount of the anti-sagging agent used is preferably 0.1 parts by weight to 20 parts by weight, with respect to 100 parts by weight of the organic polymer having a hydrolyzable silyl group (A).

<Antioxidant>

For the present curable composition, an antioxidant (anti-aging agent) can be used. Using an antioxidant makes it possible to enhance the weather resistance of the cured product. Examples of the antioxidant include hindered phenol-based antioxidants, monophenol-based antioxidants, bisphenol-based antioxidants, and polyphenol-based antioxidants. Specific examples of the antioxidant are also disclosed in Japanese Patent Application Publication Tokukaihei No. 4-283259 and Japanese Patent Application Publication Tokukaihei No. 9-194731.

The amount of the antioxidant used is preferably 0.1 parts by weight to 10 parts by weight, and particularly preferably 0.2 parts by weight to 5 parts by weight, with respect to 100 parts by weight of the organic polymer having a hydrolyzable silyl group (A).

<Photo Stabilizer>

For the present curable composition, a photo stabilizer can be used. Using a photo stabilizer makes it possible to prevent deterioration of the cured product due to photooxidation. Examples of the photo stabilizer include benzotriazole-based compounds, hindered amine-based compounds, and benzoate-based compounds, and hindered amine-based compounds are particularly preferable.

The amount of the photo stabilizer used is preferably 0.1 parts by weight to 10 parts by weight, and particularly preferably 0.2 parts by weight to 5 parts by weight, with respect to 100 parts by weight of the organic polymer having a hydrolyzable silyl group (A).

<Ultraviolet Absorbent>

For the present curable composition, an ultraviolet absorbent can be used. Using an ultraviolet absorbent makes it possible to enhance the weather resistance of the surface of the cured product. Examples of the ultraviolet absorbent include benzophenone-based compounds, benzotriazole-based compounds, salicylate-based compounds, substituted acrylonitrile-based compounds, hydroxyphenyltriazine-based compounds, and metal chelating compounds. The benzotriazole-based compounds and the hydroxyphenyltriazine-based compounds are particularly preferable. Examples of commercial names include Tinuvin P, Tinuvin 213, Tinuvin 234, Tinuvin 326, Tinuvin 327, Tinuvin 328, Tinuvin 329, Tinuvin 571, Tinuvin 400, Tinuvin 405, Tinuvin 460, Tinuvin 477, and Tinuvin 479 (available from BASF).

The amount of the ultraviolet absorbent used is preferably 0.1 parts by weight to 10 parts by weight, and particularly preferably 0.2 parts by weight to 5 parts by weight, with respect to 100 parts by weight of the organic polymer having a hydrolyzable silyl group (A).

<Physical Property Adjusting Agent>

To the present curable composition, a physical property adjusting agent for adjusting tensile properties of the cured product to be produced may be added, as necessary. The physical property adjusting agent is not particularly limited, and examples thereof include: alkylalkoxysilanes such as phenoxytrimethylsilane, methyltrimethoxysilane, dimethyldimethoxysilane, trimethylmethoxysilane, and n-propyltrimethoxysilane; arylalkoxysilanes such as diphenyldimethoxysilane and phenyltrimethoxysilane; alkylisopropenoxysilanes such as dimethyldiisopropenoxysilane, methyltriisopropenoxysilane, and γ-glycidoxypropylmethyldiisopropenoxysilane; trialkylsilyl borates such as tris(trimethylsilyl) borate and tris(triethylsilyl) borate; silicone varnishes; and polysiloxanes. Using the physical property adjusting agent makes it possible to increase hardness when the composition of the present invention is cured or, conversely, to lower the hardness so that elongation at break is exhibited. One of the above physical property adjusting agents may be used alone, or two or more types thereof may be used in combination.

In particular, a compound which produces, by hydrolysis, a compound having a monovalent silanol group in a molecule has an effect of lowering the modulus of the cured product without worsening the stickiness of the surface of the cured product. In particular, a compound that produces trimethylsilanol is preferable. Examples of the compound which produces, by hydrolysis, a compound having a monovalent silanol group in a molecule include silicon compounds which are derivatives of alcohol such as hexanol, octanol, phenol, trimethylolpropane, glycerin, pentaerythritol, and sorbitol and which produce, by hydrolysis, silane monool. Specific examples include phenoxytrimethylsilane and tris((trimethylsiloxy)methyl)propane.

The amount of the physical property adjusting agent used is preferably 0.1 parts by weight to 10 parts by weight, and particularly preferably 0.5 parts by weight to 5 parts by weight, with respect to 100 parts by weight of the organic polymer having a hydrolyzable silyl group (A).

<Tackifier Resin>

To the present curable composition, a tackifier resin can be added, as necessary, for the purpose of enhancing the adhesiveness and adhesion to a base material or for the other purposes. The tackifier resin is not particularly limited, and can be a generally used resin.

Specific examples of the tackifier resin include: terpene-based resins; aromatic modified terpene resins; hydrogenated terpene resins; terpene-phenol resins; phenol resins; modified phenol resins; xylene-phenol resins; cyclopentadiene-phenol resins; coumarone indene resins; rosin-based resins; rosin ester resins; hydrogenated rosin ester resins; xylene resins; low molecular weight polystyrene-based resins; styrene copolymer resins; styrene-based block copolymers and hydrogenated products thereof; petroleum resins (for example, C5 hydrocarbon resin, C9 hydrocarbon resin, and C5C9 hydrocarbon copolymer resin); hydrogenated petroleum resins; and DCPD resins. One of these tackifier resins may be used alone, or two or more types thereof may be used in combination.

The amount of the tackifier resin used is preferably 2 parts by weight to 100 parts by weight, more preferably 5 parts by weight to 50 parts by weight, and even more preferably 5 parts to 30 parts, with respect to 100 parts by weight of the organic polymer having a hydrolyzable silyl group (A). In a case where the amount of the tackifier resin is less than 2 parts by weight, an adhesive effect and an adhesion effect with respect to the base material are unlikely to be obtained. In a case where the amount of the tackifier resin is more than 100 parts by weight, the viscosity of the composition becomes excessively high, and handling of the composition may become difficult.

<Compound Containing an Epoxy Group>

For the present curable composition, a compound containing an epoxy group can be used. Using a compound having an epoxy group makes it possible to increase the recoverability of the cured product. Examples of the compound having an epoxy group include epoxidized unsaturated fats and oils, epoxidized unsaturated fatty acid esters, alicyclic epoxy compounds, and epichlorohydrin derivatives, and mixtures of these. Specific examples include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. The epoxy compound may be used in a range of 0.5 parts by weight to 50 parts by weight, with respect to 100 parts by weight of the organic polymer having a hydrolyzable silyl group (A).

<Photocurable Substance>

For the present curable composition, a photocurable substance can be used. Using a photocurable substance causes a film of the photocurable substance to be formed on the surface of the cured product. This makes it possible to improve the stickiness of the cured product and the weather resistance of the cured product. There are many known examples of such compounds, such as organic monomers, oligomers, resins, and compositions containing any of these. Representative examples include monomers having one to several acrylic or methacrylic unsaturated groups, oligomers having one to several acrylic or methacrylic unsaturated groups, and mixtures thereof such as unsaturated acrylic compounds, polyvinyl cinnamates, and azidated resins.

The photocurable substance may be used in a range of 0.1 parts by weight to 20 parts by weight and preferably 0.5 parts by weight to 10 parts by weight, with respect to 100 parts by weight of the organic polymer having a hydrolyzable silyl group (A). In a case where the amount of the photocurable substance is not more than 0.1 parts by weight, there is no effect of enhancing the weather resistance. In a case where the amount of the photocurable substance is not less than 20 parts by weight, the cured product tends to become too hard and crack.

<Oxygen Curable Substance>

For the present curable composition, an oxygen curable substance can be used. Examples of the oxygen curable substance include unsaturated compounds which can react with oxygen in the air. The oxygen curable substance serve to prevent (i) surface stickiness and (ii) the attachment of dirt or dust to the surface of the cured product by reacting with oxygen in the air to form a cured film near the surface of the cured product. Specific examples of the oxygen curable substance include: drying oils, representative examples of which are tung oil and linseed oil, and various alkyd resins obtained by modification of these compounds; drying oil-modified acrylic polymers, drying oil-modified epoxy-based resins, and drying oil-modified silicone resins; liquid polymers such as 1,2-polybutadiene, 1,4-polybutadiene, and polymers of C5-C8 dienes, which are obtained by polymerizing or copolymerizing diene-based compounds such as butadiene, chloroprene, isoprene, and 1,3-pentadiene. One of these oxygen curable substances may be used alone, or two or more types thereof may be used in combination.

The oxygen curable substance may be used in a range of 0.1 parts by weight to 20 parts by weight and more preferably 0.5 parts by weight to 10 parts by weight, with respect to 100 parts by weight of the organic polymer having a hydrolyzable silyl group (A). In a case where the amount of the oxygen curable substance used is less than 0.1 parts by weight, improvement of contamination properties is insufficient. In a case where the amount of the oxygen curable substance used is more than 20 parts by weight, the tensile properties and the like of the cured product tends to deteriorate. As disclosed in Japanese Patent Application Publication Tokukaihei No. 3-160053, the oxygen curable substance may be used in combination with the photocurable substance.

(2-6. Preparation of Curable Composition)

The present curable composition can be prepared as a one-component curable composition in which all components are blended in advance, which is stored in a sealed state, and which cures by moisture in the air after being applied. Alternatively, the present curable composition can be prepared as a two-component curable composition in which components such as a curing catalyst, a filler, a plasticizer, and water are separately blended as a curing agent and the blended components and an organic polymer composition are mixed before use. In terms of the workability, the present curable composition is preferably a one-component curable composition.

In a case where the present curable composition is a one-component curable composition, all the components are blended in advance. Therefore, components which contain moisture are preferably dehydrated and dried prior to use, or be dehydrated during blending and kneading by, for example, pressure reduction. Note that storage stability is further enhanced by adding an alkoxysilane compound in addition to carrying out such a dehydration drying method. Examples of the alkoxysilane compound include methyltrimethoxysilane, phenyltrimethoxysilane, n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane, and methylcarbamate methyltrimethoxysilane. Furthermore, by adding calcium oxide, the storage stability and the adhesiveness after an alkali hot water test are further enhanced. As a dehydrating agent, for example, a partially condensed silane compound, such as Dynasylan 6490 from Evonik, can also be suitably used, from the viewpoint of safety, stability, and the like.

The dehydrating agent, in particular, a silicon compound which can react with water, such as vinyltrimethoxysilane and methylcarbamate methyltrimethoxysilane, is used in a range of 0.1 parts by weight to 20 parts by weight, and preferably 0.5 parts by weight to 10 parts by weight, with respect to 100 parts by weight of the organic polymer having a hydrolyzable silyl group (A).

[3. Cured Product]

In an embodiment of the present invention, provided is a cured product (hereinafter referred to as "the present cured product") which is obtained by curing the present curable composition.

The present cured product is formed by curing the present curable composition. Therefore, the present cured product has excellent adhesiveness.

In an embodiment of the present invention, the present cured product is formed by curing the following curable composition at room temperature or a temperature increased up to 70° C.

A curable composition containing: an A agent that contains an (A) component, a (B) component, and a (C) component; and a B agent that contains a (D) component.

[4. Applications]

The present curable composition can be used for various applications including the following: waterproofing materials; architectural and industrial sealants such as construction-use elastic sealants, siding board-use sealants, insulating glass-use sealants, and vehicle-use sealants; electrical and electronic component materials such as a solar cell backside sealant; electrical insulating materials such as insulating covering materials for electric wires and cables; pressure sensitive adhesives; adhesive agents (for example, elastic adhesive agents, contact adhesive agents, adhesive agents for tiles, reactive hot melt adhesive agents); paints; powder coating materials; coating materials; foams; sealants for can lids etc.; heat dissipation sheets; potting agents for electrical and electronic use; films; gaskets; marine deck caulking; casting materials; various molding materials; sealing materials for preventing rust or for waterproofing of edge surfaces (cut parts) of artificial marbles and wired glass or laminated glass; vibration-proofing, damping, soundproofing, and antiseismic materials for use in automobiles, ships, and home electronics; and liquid sealants for use in, for example, automobile parts, electric parts, and various mechanical parts.

In an embodiment of the present invention, provided is an adhesive agent which contains the present curable composition, preferably an adhesive agent which contains the present curable composition and which is for a tile.

In an embodiment of the present invention, provided is a laminated body in which a tile is disposed on at least one surface of a base material with an adhesive agent containing the present curable composition therebetween. In the present embodiment, examples of the base material include mortar, concrete, ceramics, sanitary ceramics, wooden substrates, and water proof sheets. Examples of the laminated body include walls and floors, and the laminated body is preferably a floor.

The present invention is not limited to the embodiments, but can be altered by a skilled person in the art within the scope of the claims. The present invention also encompasses, in its technical scope, any embodiment derived by combining technical means disclosed in differing embodiments.

Namely, invention encompasses the following embodiments.

<1> A curable composition containing:

(A) 100 parts by weight of an organic polymer having a hydrolyzable silyl group;

(B) 3 parts by weight to 35 parts by weight of at least one type of process oil selected from the group consisting of paraffinic process oils, naphthenic process oils, and aromatic process oils;

(C) 20 parts by weight to 200 parts by weight of silica sand;

(D) 2 parts by weight to 10 parts by weight of a silane compound having an epoxy group and/or a silane compound having an amino group.

<2> The curable composition as described in <1>, wherein the organic polymer (A) is a hydrolyzable silyl group-containing polyoxyalkylene-based polymer (A1) and/or a hydrolyzable silyl group-containing (meth) acrylic ester-based copolymer (A2).

<3> The curable composition as described in <2>, wherein a main chain of the hydrolyzable silyl group-containing polyoxyalkylene-based polymer (A1) is polypropylene glycol.

<4> The curable composition as described in any one of <1> through <3>, further containing 150 parts by weight to 400 parts by weight of calcium carbonate.

<5> A cured product obtained by curing a curable composition described in any one of <1> through <4>.

<6> An adhesive agent containing a curable composition described in <1> through <4>.

<7> A laminated body in which a tile is disposed on at least one surface of a base material with an adhesive agent described in <1> or <2> between the tile and the at least one surface.

EXAMPLES

The following description describes the present invention in more detail with reference to Examples. Note, however, that the present invention is not limited by Examples.

[Materials]

Materials used in Examples and Comparative Examples are as follows.

((a) Component)

Organic polymers (A-1), (A-2), (A-3), (A-4), and (A-5) produced in accordance with Synthesis Examples below were used.

((B) Component)

Process oil (B-1): Diana Process Oil PS-32 (paraffinic process oil, available from Idemitsu Kosan Co., Ltd.)

Process oil (B-2): VC clean A195 (paraffinic process oil, available from Andoh Parachemie Co., Ltd.)

Process oil (B-3): liquid paraffin (reagent, available from FUJIFILM Wako Pure Chemical Corporation)

Process oil (B-4): Exxol D80 (naphthenic process oil, available from Andoh Parachemie Co., Ltd.)

Process oil (B-5): Diana Process Oil NP-24 (naphthenic process oil, available from Idemitsu Kosan Co., Ltd.)

Process oil (B-6): Diana Process Oil AC-12 (aromatic process oil, available from Idemitsu Kosan Co., Ltd.)

((C) Component)

Silica sand: silica sand No. 8 (available from Maruo Calcium Co., Ltd.)

((D) Component)

Silane compound having an epoxy group: Silquest A-187 (3-glycidoxypropyltrimethoxysilane, available from Momentive Performance Materials Inc.)

Silane compound having an amino group: Silquest A-1120 (N-(β-aminoethyl)-γ-aminopropyltrimethoxysilane, "aminosilane", available from Momentive Performance Materials Inc.)

(Other Components)

Plasticizer: DIDP (diisodecyl phthalate, available from J-PLUS Co., Ltd.)

Heavy calcium carbonate-1: TC-1016 (available from Maruo Calcium Co., Ltd.)

Heavy calcium carbonate-2: Omyacarb 2T-HB (available from Omya)

Colloidal calcium carbonate-1: Viscolite EL20 (available from Shiraishi Kogyo Kaisha, Ltd.)

Colloidal calcium carbonate-2: TNA (available from TAEKYUNG BK Co., Ltd., Korea)

Antioxidant: Irganox 1010 (available from BASF Japan Ltd.)

Dehydrating agent-1: Silquest A-171 (vinyltrimethoxysilane, available from Momentive Performance Materials Inc.)

Dehydrating agent-2: calcium oxide (CML35 (available from Ohmi Chemical Industry Co., Ltd.))

Curing catalyst: NEOSTANN U-130 (dibutyltin-based curing catalyst, available from Nitto Kasei Co., Ltd.)

Epoxy resin: Epikote 828 (bisphenol A epoxy resin, available from Hexion)

Curing agent for an epoxy resin: Ancamine K54 (available from Evonik Japan Co., Ltd.)

[Measurement and Evaluation Methods]

In Examples and Comparative Examples, measurement and evaluation were carried out by the following methods.

(Viscosity)

The viscosities, at 1 rpm, 2 rpm, and 10 rpm, of compositions prepared in Examples were measured with use of a BS-type viscometer (available from TOKIMEC, Rotor No. 7). The viscosities were set as initial viscosities (Pas).

(Workability)

With regard to the curable compositions prepared in Examples, handleability with a trowel and stringiness when the curable compositions were touched with a toothed trowel were evaluated. Specifically, appropriate amounts of the curable compositions were each placed on a plate placed horizontally, and smoothed to a thickness of 7 mm to 10 mm with use of a spatula or the like. Thereafter, a standard toothed trowel was pulled toward the front side of an evaluator at once in a state where the standard toothed trowel stood at an angle of 60 degrees. In a case where the curable composition extended not less than 5 mm to the toothed trowel when the toothed trowel was lifted, it was determined that there was stringiness. In a case where the curable composition extended less than 5 mm, it was determined that there was no stringiness. Note that a standard toothed trowel which was for an elastic adhesive agent and which had a tooth height of 5 mm (product name: LKT-5) was used as the toothed trowel. Workability was evaluated as follows.

"Satisfactory": A case where resistance felt with the toothed trowel (trowel handleability) was satisfactory and there was no stringiness.

"Poor": A case where the resistance felt with the toothed trowel (trowel handleability) was extremely light or extremely heavy, or a case where there was stringiness.

(Tensile Physical Properties)

The curable compositions prepared in Examples were each formed into a sheet-like test piece having a thickness of approximately 3 mm. The sheet-like test piece was aged at 23° C. for 3 days and at 50° C. for 4 days so as to be cured. Thereafter, the sheet-like test piece was cut out so as to have a Type 3 dumb-bell shape. With use of an autograph available from Shimatsu Corporation, a tensile test (23° C., 50% R.H.) was carried out at a tensile speed of 200 mm/min, and a 50% tensile modulus, breaking strength, and elongation at break (%) were measured.

(Adhesiveness to Tile)

In conformity with JIS A 5557-2020 (organic adhesives for exterior tile finishing), a test was carried out with use of a ceramic tile from LIXIL Corporation.

Standard aging: A test piece was aged at 23° C. and 50% R.H. for 28 days.

Alkali hot water immersion treatment: After the standard aging, the test piece was immersed in a saturated aqueous solution of calcium hydroxide at 60° C. for 7 days.

(Odor)

With regard to the curable compositions prepared in Examples, odors were evaluated in accordance with the following three levels of criteria.

1 Almost no odor was identified even in a case where the nose was brought close to the curable composition with a distance of 10 cm therebetween.

2 An odor was able to be identified in a case where the nose was brought close to the curable composition with a distance of 10 cm therebetween.

3 An odor was able to be identified in a case where the nose was brought close to the curable composition even with a distance of more than 10 cm therebetween.

(Number Average Molecular Weight)

The following device was used to measure a number average molecular weight. A measured value is a polystyrene-equivalent molecular weight.

Solution sending system: HLC-8120GPC (available from Tosoh Corporation)

Column: TSK-GEL H type (available from Tosoh Corporation)

Solvent: THF (Method for Measuring the Number of Terminal Silyl Group)

The number of terminal silyl groups was calculated from a result of $^1H$-NMR measurement. The following device was used for the $^1H$-NMR measurement.

Measurement apparatus: JNM-LA400 (available from JEOL Ltd.)

Solvent: CDCl3

Synthesis Example 1: Organic Polymer (A-1) (Corresponding to (A1) Component)

A polyoxyalkylene-based polymer (A-1) in which methyldimethoxysilyl groups were introduced in molecule terminals was synthesized by the following procedure.

1. Propylene oxide was polymerized to obtain polypropylene oxide having a number average molecular weight of approximately 16,00. As an initiator, polyoxypropylene triol was used (molecular weight: approximately 4,500). As a catalyst, a zinc hexacyanocobaltate glyme complex was used. The obtained polypropylene oxide had hydroxy groups at three molecule terminals.

2. As a methanol solution, 1.2 equivalents of NaOMe with respect to the hydroxy groups at the molecule terminals of the polypropylene oxide was added. Methanol was distilled off.
3. By adding 1.5 molar equivalents of allyl chloride, the hydroxy groups at the molecule terminals of the polypropylene oxide were converted into allyl groups. Unpurified allyl-terminated polypropylene oxide was thus obtained. 4. With 100 parts by weight of the unpurified allyl-terminated polypropylene oxide, 300 parts by weight of n-hexane and 300 parts by weight of water were mixed, and an obtained mixture was stirred. Thereafter, the water was removed by centrifugal separation.
5. With an obtained solution, 300 parts by weight of water was mixed again, and an obtained mixture was stirred. Thereafter, the water was removed by centrifugal separation.
6. The hexane was removed by devolatilization under reduced pressure. Purified allyl-terminated polypropylene oxide was thus obtained.
7. To 100 parts by weight of the purified allyl group-terminated polypropylene oxide, 1.80 parts by weight of methyldimethoxysilane was added, and an obtained mixture was reacted at 90° C. for 2 hours. As a catalyst, an isopropanol solution of a platinum-vinylsiloxane complex (platinum content: 3 wt %) was used. The catalyst had a concentration of 150 ppm in a system. An organic polymer (A-1) was thus obtained.

The organic polymer (A-1) was polypropylene oxide having terminals in which methyldimethoxysilyl groups were introduced, and had a number average molecular weight of approximately 16,000. As a result of $^1$H-NMR measurement, it was found that the organic polymer (A-1) had 0.7 dimethoxymethylsilyl groups on average at one terminal and 2.1 dimethoxymethylsilyl groups on average in one molecule.

Synthesis Example 2: Organic Polymer (A-2) (Corresponding to (A1) Component)

A polyoxyalkylene-based polymer (A-2) in which methyldimethoxysilyl groups were introduced in molecule terminals was synthesized by the following procedure.

1. Propylene oxide was polymerized to obtain polypropylene oxide having a number average molecular weight of approximately 15,000. As an initiator, polyoxypropylene diol was used (molecular weight: approximately 4,500). As a catalyst, a zinc hexacyanocobaltate glyme complex was used. The obtained polypropylene oxide had hydroxy groups at both molecule terminals.
2. By a procedure similar to the procedure in the steps 2 to 6 of the above synthesis example of the organic polymer (A-1), purified allyl-terminated polypropylene oxide was obtained.
3. To 100 parts by weight of the purified allyl group-terminated polypropylene oxide, 1.70 parts by weight of methyldimethoxysilane was added, and an obtained mixture was reacted at 90° C. for 2 hours. As a catalyst, an isopropanol solution of a platinum-vinylsiloxane complex (platinum content: 3 wt %) was used. The catalyst had a concentration of 150 ppm in a system. An organic polymer (A-2) was thus obtained.

The organic polymer (A-2) was polypropylene oxide having terminals in which methyldimethoxysilyl groups were introduced, and had a number average molecular weight of approximately 15,000. As a result of $^1$H-NMR measurement, it was s found that the organic polymer (A-2) had 0.8 dimethoxymethylsilyl groups on average at one terminal and 1.5 dimethoxymethylsilyl groups on average in one molecule.

Synthesis Example 3: Organic Polymer (A-3) (Corresponding to (A1) Component)

A polyoxyalkylene-based polymer (A-3) in which methyldimethoxysilyl groups were introduced in molecule terminals was synthesized by the following procedure.

1. Propylene oxide was polymerized to obtain polypropylene oxide having a number average molecular weight of approximately 26,000. As an initiator, polyoxypropylene triol was used (molecular weight: approximately 4,500). As a catalyst, a zinc hexacyanocobaltate glyme complex was used. The obtained polypropylene oxide had hydroxy groups at three molecule terminals.
2. By a procedure similar to the procedure in the steps 2 to 6 of the above synthesis example of the organic polymer (A-1), purified allyl-terminated polypropylene oxide was obtained.
3. To 100 parts by weight of the purified allyl group-terminated polypropylene oxide, 1.30 parts by weight of methyldimethoxysilane was added, and an obtained mixture was reacted at 90° C. for 2 hours. As a catalyst, an isopropanol solution of a platinum-vinylsiloxane complex (platinum content: 3 wt %) was used. The catalyst had a concentration of 150 ppm in a system. An organic polymer (A-3) was thus obtained.

The organic polymer (A-3) was polypropylene oxide having terminals in which methyldimethoxysilyl groups were introduced, and had a number average molecular weight of approximately 26,000. As a result of $^1$H-NMR measurement, it was found that the organic polymer (A-3) had 0.7 dimethoxymethylsilyl groups on average at one terminal and 2.2 dimethoxymethylsilyl groups on average in one molecule.

Synthesis Example 4: Organic Polymer (A-4) (Corresponding to (A1) Component)

A polyoxyalkylene-based polymer (A-4) in which methyldimethoxysilyl groups were introduced in molecule terminals was synthesized by the following procedure.

1. Propylene oxide was polymerized to obtain polypropylene oxide having a number average molecular weight of approximately 29,000. As an initiator, polyoxypropylene diol was used (molecular weight: approximately 4,500). As a catalyst, a zinc hexacyanocobaltate glyme complex was used. The obtained polypropylene oxide had hydroxy groups at both molecule terminals.
2. As a methanol solution, 1.0 molar equivalent of NaOMe with respect to the hydroxy groups at the molecule terminals of the polypropylene oxide was added. Methanol was distilled off.
3. To the hydroxy groups of the hydroxy group-terminated polypropylene oxide, 1.0 molar equivalent of allyl glycidyl ether was added, and a resultant mixture was reacted at 130° C. for 2 hours. Subsequently, 0.28 molar equivalents of NaOMe was added as a methanol solution, methanol was removed, and then 1.8 molar equivalents of allyl chloride was further added to convert the hydroxy groups at the molecule terminals of the polypropylene oxide to allyl groups. Unpurified allyl-terminated polypropylene oxide was thus obtained.

4. With 100 parts by weight of the unpurified allyl-terminated polypropylene oxide, 300 parts by weight of n-hexane and 300 parts by weight of water were mixed, and an obtained mixture was stirred. Thereafter, the water was removed by centrifugal separation.
5. With an obtained solution, 300 parts by weight of water was mixed again, and an obtained mixture was stirred. Thereafter, the water was removed by centrifugal separation.
6. The hexane was removed by devolatilization under reduced pressure. Purified allyl-terminated polypropylene oxide was thus obtained.
7. To 100 parts by weight of the purified allyl group-terminated polypropylene oxide, 1.90 parts by weight of methyldimethoxysilane was added, and an obtained mixture was reacted at 90° C. for 2 hours. As a catalyst, an isopropanol solution of a platinum-vinylsiloxane complex (platinum content: 3 wt %) was used. The catalyst had a concentration of 150 ppm in a system. An organic polymer (A-4) was thus obtained.

The organic polymer (A-4) was polypropylene oxide having terminals in which methyldimethoxysilyl groups were introduced, and had a number average molecular weight of approximately 29,000. As a result of $^1$H-NMR measurement, it was found that the organic polymer (A-4) had 1.7 dimethoxymethylsilyl groups on average at one terminal and 3.4 dimethoxymethylsilyl groups on average in one molecule.

Synthesis Example 5: Organic Polymer (A-5) (Corresponding to (A1) Component)

A polyoxyalkylene-based polymer (A-5) in which trimethoxysilyl groups were introduced in molecule terminals was synthesized by the following procedure.

1. Propylene oxide was polymerized to obtain polypropylene oxide having a number average molecular weight of approximately 29,000. As an initiator, polyoxypropylene diol was used (molecular weight: approximately 4,500). As a catalyst, a zinc hexacyanocobaltate glyme complex was used. The obtained polypropylene oxide had hydroxy groups at both molecule terminals.
2. To 100 parts by weight of this hydroxy group-terminated polypropylene oxide, 10 ppm of bismuth (III) tris(2-ethylhexanoate) and 1.9 parts by weight of 3-isocyanatepropyltrimethoxysilane were added, and an obtained mixture was reacted at 90° C. for 2 hours. An organic polymer (A-5) was thus obtained.

The organic polymer (A-5) was polypropylene oxide having terminals in which trimethoxysilyl groups were introduced, and had a number average molecular weight of approximately 29,500. As a result of $^1$H-NMR measurement, it was found that the organic polymer (A-5) had 1.0 trimethoxysilyl group on average at one terminal and 2.0 trimethoxysilyl groups on average in one molecule.

Example 1

The organic polymer (A-1), the process oil (B-1), the silica sand, the plasticizer, the heavy calcium carbonate-1, the colloidal calcium carbonate-1, the antioxidant, and the dehydrating agent-2 were measured out in the proportion shown in Table 1 and mixed. An obtained mixture was passed through a three-roll paint mill three times so as to be dispersed. After this was left to stand overnight in a thermostatic chamber at 23° C. and 50%, and the viscosity of a composition was measured.

Next, the silane compound having an epoxy group, the dehydrating agent-1, and the curing catalyst were added in the proportion shown in Table 1, and an obtained mixture was kneaded to obtain a curable composition. The kneading was carried out with use of a planetary centrifugal mixer (available from Thinky Corporation, Awatori Rentaro ARE-250). The various physical properties of the prepared curable composition were evaluated by the methods described in the section [Measurement and evaluation methods] above. Table 1 shows results. Note that the amounts of the components shown in Table 1 are indicated by parts by weight.

Examples 2 to 13 and Comparative Examples 1 to 9

Curable compositions were prepared by a procedure similar to that in Example 1, except that the amounts of components blended were changed to those shown in Tables 1 and 2. The various physical properties of the prepared curable compositions were evaluated by the methods described in the section [Measurement and evaluation methods] above. Tables 1 and 2 show results.

TABLE 1

| | | | Examples | | | | | | |
|---|---|---|---|---|---|---|---|---|---|
| | | | 1 | 2 | 3 | 4 | 5 | 6 | 7 |
| Blend | (A) component | Organic polymer (A-1) | 100 | 100 | 100 | 100 | | | |
| | | Organic polymer (A-2) | | | | | 100 | | |
| | | Organic polymer (A-3) | | | | | | 100 | 100 |
| | | Organic polymer (A-4) | | | | | | | |
| | | Organic polymer (A-5) | | | | | | | |
| | (B) component | Process oil (B-1) | 15 | | | | | | |
| | | Process oil (B-2) | | 15 | | | | | |
| | | Process oil (B-3) | | | 15 | | | | |
| | | Process oil (B-4) | | | | 15 | 15 | 15 | 15 |
| | | Process oil (B-5) | | | | | | | |
| | | Process oil (B-6) | | | | | | | |

TABLE 1-continued

| | | | | | | | | | |
|---|---|---|---|---|---|---|---|---|---|
| | (C) component | Silica sand | 100 | 100 | 100 | 100 | 100 | 100 | 100 |
| | (D) component | Silane compound having epoxy group | 3 | 3 | 3 | 3 | 3 | 3 | 3 |
| | | Silane compound having amino group | | | | | | | |
| | Other components | Plasticizer | 5 | 5 | 5 | 5 | 5 | 5 | 5 |
| | | Heavy calcium carbonate-1 | 150 | | | | | | |
| | | Heavy calcium carbonate-2 | | 150 | 150 | 150 | 120 | 120 | 150 |
| | | Colloidal calcium carbonate-1 | 50 | | | | | | |
| | | Colloidal calcium carbonate-2 | | 50 | 50 | 50 | 80 | 80 | 50 |
| | | Antioxidant | 1 | 1 | 1 | 1 | 1 | 1 | 1 |
| | | Dehydrating agent-1 | 2 | 2 | 2 | 2 | 2 | 2 | 2 |
| | | Dehydrating agent-2 | 50 | 50 | 50 | 50 | 50 | 50 | 50 |
| | | Curing catalyst | 1 | 1 | 1 | 1 | 1 | 1 | 1 |
| | | Epoxy resin | | | | | | | |
| | | Curing agent for epoxy resin | | | | | | | |
| Evaluation | Viscosity | 1 rpm (Pa · s) | 3590 | 1385 | 2325 | 1490 | 3060 | 4960 | 2375 |
| | | 2 rpm (Pa · s) | 2140 | 825 | 1425 | 915 | 1755 | 2960 | 1510 |
| | | 10 rpm (Pa · s) | 680 | 290 | 525 | 320 | 555 | 975 | 575 |
| | Workability | Trowel handleability, stringiness | S | S | S | S | S | S | S |
| | Odor | | 1 | 1 | 1 | 1 | 1 | 1 | 1 |
| | Tensile physical properties | 50% modulus (MPa) | 0.45 | 0.94 | 0.69 | 0.97 | 0.96 | 1.13 | 1.06 |
| | | Breaking strength (MPa) | 0.65 | 0.96 | 0.72 | 1.00 | 1.06 | 1.23 | 1.11 |
| | | Elongation at break (%) | 180 | 80 | 95 | 80 | 125 | 115 | 100 |
| | Adhesiveness to tile (standard aging) | Adhesion strength (N/mm2) | 0.86 | 1.19 | 1.03 | 1.17 | 1.16 | 1.46 | 1.36 |
| | | Cohesive failure rate | 97% | 95% | 97% | 96% | 84% | 87% | 87% |
| | Adhesiveness to tile (alkali hot water immersion treatment) | Adhesion strength (N/mm2) | 0.54 | 0.58 | 0.53 | 0.83 | 0.4 | 0.57 | 0.62 |
| | | Cohesive failure rate | 85% | 50% | 70% | 55% | 60% | 61% | 88% |

| | | | Examples | | | | | |
|---|---|---|---|---|---|---|---|---|
| | | | 8 | 9 | 10 | 11 | 12 | 13 |
| Blend | (A) component | Organic polymer (A-1) | | | | | | |
| | | Organic polymer (A-2) | | | | | | |
| | | Organic polymer (A-3) | | 100 | 100 | 100 | 100 | |
| | | Organic polymer (A-4) | 85 | | | | | |
| | | Organic polymer (A-5) | | | | | | 100 |
| | (B) component | Process oil (B-1) | | | | | | 15 |
| | | Process oil (B-2) | | | | | | |
| | | Process oil (B-3) | | | | | | |
| | | Process oil (B-4) | 15 | | | 15 | 5 | |
| | | Process oil (B-5) | | 15 | | | | |
| | | Process oil (B-6) | | | 15 | | | |
| | (C) component | Silica sand | 100 | 100 | 100 | 100 | 100 | 100 |
| | (D) component | Silane compound having epoxy group | 3 | 3 | 3 | | 3 | 3 |
| | | Silane compound having amino group | | | | 3 | | |
| | Other components | Plasticizer | 5 | 5 | 5 | 5 | 5 | 5 |
| | | Heavy calcium carbonate-1 | | | | | | |
| | | Heavy calcium carbonate-2 | 150 | 150 | 150 | 150 | 150 | 150 |
| | | Colloidal calcium carbonate-1 | | | | | | |
| | | Colloidal calcium carbonate-2 | 50 | 50 | 50 | 50 | 50 | 50 |
| | | Antioxidant | 1 | 1 | 1 | 1 | 1 | 1 |
| | | Dehydrating agent-1 | 2 | 2 | 2 | 2 | 2 | 2 |
| | | Dehydrating agent-2 | 50 | 50 | 50 | 50 | 50 | 50 |
| | | Curing catalyst | 1 | 1 | 1 | 1 | 1 | 0.1 |
| | | Epoxy resin | | | | | | |
| | | Curing agent for epoxy resin | | | | | | |
| Evaluation | Viscosity | 1 rpm (Pa · s) | 4580 | 3890 | 3830 | 2375 | 4970 | 5010 |
| | | 2 rpm (Pa · s) | 2880 | 2430 | 2400 | 1530 | 3140 | 3670 |
| | | 10 rpm (Pa · s) | 1125 | 954 | 960 | 590 | 1265 | 2155 |
| | Workability | Trowel handleability, stringiness | S | S | S | S | S | S |
| | Odor | | 1 | 1 | 1 | 1 | 1 | 1 |
| | Tensile physical properties | 50% modulus (MPa) | 1.12 | 0.95 | 0.97 | 1.52 | 1.09 | 1.22 |
| | | Breaking strength (MPa) | 1.16 | 1.00 | 1.00 | 1.53 | 1.11 | 1.28 |
| | | Elongation at break (%) | 85 | 110 | 105 | 55 | 90 | 110 |
| | Adhesiveness to tile (standard aging) | Adhesion strength (N/mm2) | 1.56 | 1.24 | 1.20 | 1.21 | 1.31 | 1.31 |
| | | Cohesive failure rate | 85% | 94% | 95% | 95% | 87% | 97% |

TABLE 1-continued

| | | | | | | | | |
|---|---|---|---|---|---|---|---|---|
| | Adhesiveness to tile (alkali hot water immersion treatment) | Adhesion strength (N/mm2) | 0.79 | 0.70 | 0.82 | 0.73 | 0.78 | 0.84 |
| | | Cohesive failure rate | 80% | 81% | 92% | 54% | 81% | 93% |

"S" stands for "satisfactory".

"P" stands for "poor".

TABLE 2

| | | | Comparative Examples | | | | |
|---|---|---|---|---|---|---|---|
| | | | 1 | 2 | 3 | 4 | 5 |
| Blend | (A) component | Organic polymer (A-1) | 100 | 100 | | | |
| | | Organic polymer (A-2) | | | | | |
| | | Organic polymer (A-3) | | | 100 | 100 | 100 |
| | | Organic polymer (A-4) | | | | | |
| | | Organic polymer (A-5) | | | | | |
| | (B) component | Process oil (B-1) | | | | | |
| | | Process oil (B-2) | | | | | |
| | | Process oil (B-3) | | | | | |
| | | Process oil (B-4) | | | 15 | 15 | 15 |
| | | Process oil (B-5) | | | | | |
| | | Process oil (B-6) | | | | | |
| | (C) component | Silica sand | 100 | 100 | | | 100 |
| | (D) component | Silane compound having epoxy group | 3 | 3 | 3 | 3 | |
| | | Silane compound having amino group | | | | | |
| | Other components | Plasticizer | 20 | 20 | 5 | 5 | 5 |
| | | Heavy calcium carbonate-1 | 150 | | | | |
| | | Heavy calcium carbonate-2 | | 150 | 250 | 200 | 150 |
| | | Colloidal calcium carbonate-1 | 50 | | | | |
| | | Colloidal calcium carbonate-2 | | 50 | 50 | 100 | 50 |
| | | Antioxidant | 1 | 1 | 1 | 1 | 1 |
| | | Dehydrating agent-1 | 2 | 2 | 2 | 2 | 2 |
| | | Dehydrating agent-2 | 50 | 50 | 50 | 50 | 50 |
| | | Curing catalyst | 1 | 1 | 1 | 1 | 1 |
| | | Epoxy resin | | | | | |
| | | Curing agent for epoxy resin | | | | | |
| Evaluation | Viscosity | 1 rpm (Pa · s) | 3480 | 1830 | 4690 | 8770 | 2420 |
| | | 2 rpm (Pa · s) | 1980 | 1135 | 2860 | 5100 | 1495 |
| | | 10 rpm (Pa · s) | 655 | 450 | 990 | 1615 | 570 |
| | Workability | Trowel handleability, stringiness | S | S | P (There was stringiness) | P (Handling of trowel felt heavy) | S |
| | Odor | | 1 | 1 | 1 | 1 | 2 |
| | Tensile physical properties | 50% modulus (MPa) | 0.51 | 0.82 | 0.99 | 1.12 | 0.87 |
| | | Breaking strength (MPa) | 0.71 | 0.86 | 1.15 | 1.20 | 0.89 |
| | | Elongation at break (%) | 170 | 95 | 55 | 115 | 120 |
| | Adhesiveness to tile (standard aging) | Adhesion strength (N/mm2) | 0.95 | 0.97 | 1.19 | 1.31 | 0.95 |
| | | Cohesive failure rate | 96% | 93% | 94% | 90% | 87% |
| | Adhesiveness to tile (alkali hot water immersion treatment) | Adhesion strength (N/mm2) | 0.22 | 0.27 | 0.72 | 0.73 | 0.70 |
| | | Cohesive failure rate | 45% | 5% | 83% | 83% | 85% |

| | | | Comparative Examples | | | |
|---|---|---|---|---|---|---|
| | | | 6 | 7 | 8 | 9 |
| Blend | (A) component | Organic polymer (A-1) | | | 100 | 100 |
| | | Organic polymer (A-2) | | 100 | | |
| | | Organic polymer (A-3) | 100 | | | |
| | | Organic polymer (A-4) | | | | |
| | | Organic polymer (A-5) | | | | |
| | (B) component | Process oil (B-1) | | | | |
| | | Process oil (B-2) | | | | |
| | | Process oil (B-3) | | | | |
| | | Process oil (B-4) | 40 | | | |
| | | Process oil (B-5) | | | | |
| | | Process oil (B-6) | | | | |

TABLE 2-continued

| | | | | | | |
|---|---|---|---|---|---|---|
| | (C) component | Silica sand | 100 | | 250 | 100 |
| | (D) component | Silane compound having epoxy group | 3 | | 3 | 15 |
| | | Silane compound having amino group | | 2 | | |
| | Other components | Plasticizer | 5 | | 20 | 20 |
| | | Heavy calcium carbonate-1 | | | | |
| | | Heavy calcium carbonate-2 | 150 | 65 | 100 | 150 |
| | | Colloidal calcium carbonate-1 | | 10 | | |
| | | Colloidal calcium carbonate-2 | 50 | | 50 | 50 |
| | | Antioxidant | 1 | | 1 | 1 |
| | | Dehydrating agent-1 | 2 | 4 | 2 | 2 |
| | | Dehydrating agent-2 | 50 | | 50 | 50 |
| | | Curing catalyst | 1 | 1 | 1 | 1 |
| | | Epoxy resin | | 50 | | |
| | | Curing agent for epoxy resin | | 5 | | |
| Evaluation | Viscosity | 1 rpm (Pa · s) | 795 | — | 2400 | 1910 |
| | | 2 rpm (Pa · s) | 485 | — | 1615 | 1170 |
| | | 10 rpm (Pa · s) | 165 | — | 485 | 475 |
| | Workability | Trowel handleability, stringiness | P (There was stringiness) | S | S | S |
| | Odor | | 2 | 3 | 2 | 2 |
| | Tensile physical properties | 50% modulus (MPa) | 1.04 | 1.83 | 1.08 | 0.95 |
| | | Breaking strength (MPa) | 1.06 | 3.17 | 1.09 | 0.99 |
| | | Elongation at break (%) | 90 | 115 | 52 | 90 |
| | Adhesiveness to tile (standard aging) | Adhesion strength (N/mm2) | 1.09 | — | 1.10 | 1.30 |
| | | Cohesive failure rate | 91% | — | 92% | 97% |
| | Adhesiveness to tile (alkali hot water immersion treatment) | Adhesion strength (N/mm2) | 0.37 | — | 0.85 | 0.32 |
| | | Cohesive failure rate | 42% | — | 87% | 2% |

"S" stands for "satisfactory".
"P" stands for "poor".

Result

As in Tables 1 and 2, it was shown that the curable compositions of Examples 1 to 13 each had good workability and a reduced odor, and had excellent adhesiveness even after an alkaline treatment.

INDUSTRIAL APPLICABILITY

In an aspect of the present invention, it is possible to provide a curable composition which has good workability, a reduced odor, and excellent adhesiveness, and therefore possible to suitably use the curable composition as a sealant and the like.

The invention claimed is:

1. A curable composition comprising:

(A) 100 parts by weight of an organic polymer having a hydrolyzable silyl group;

(B) 3 parts by weight to 35 parts by weight of at least one type of process oil selected from the group consisting of paraffinic process oils, naphthenic process oils, and aromatic process oils;

(C) 20 parts by weight to 200 parts by weight of silica sand;

(D) 2 parts by weight to 10 parts by weight of a silane compound having an epoxy group and/or a silane compound having an amino group.

2. The curable composition as set forth in claim 1, wherein the organic polymer (A) is a hydrolyzable silyl group-containing polyoxyalkylene-based polymer (A1) and/or a hydrolyzable silyl group-containing (meth)acrylic ester-based copolymer (A2).

3. The curable composition as set forth in claim 2, wherein a main chain of the hydrolyzable silyl group-containing polyoxyalkylene-based polymer (A1) is polypropylene glycol.

4. The curable composition as set forth in claim 1, further comprising 150 parts by weight to 400 parts by weight of calcium carbonate.

5. A cured product obtained by curing a curable composition recited in claim 1.

6. An adhesive agent comprising a curable composition recited in claim 1.

7. A laminated body in which a tile is disposed on at least one surface of a base material with the adhesive agent recited in claim 6 between the tile and the at least one surface.

* * * * *